United States Patent
Iwamura et al.

(10) Patent No.: US 10,300,742 B2
(45) Date of Patent: May 28, 2019

(54) AIR-LESS TIRE

(71) Applicant: SUMITOMO RUBBER INDUSTRIES, LTD., Kobe-shi, Hyogo (JP)

(72) Inventors: Wako Iwamura, Kobe (JP); Makoto Sugiya, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 172 days.

(21) Appl. No.: 15/314,354

(22) PCT Filed: May 7, 2015

(86) PCT No.: PCT/JP2015/063177
§ 371 (c)(1),
(2) Date: Nov. 28, 2016

(87) PCT Pub. No.: WO2015/194277
PCT Pub. Date: Dec. 23, 2015

(65) Prior Publication Data
US 2017/0197467 A1    Jul. 13, 2017

(30) Foreign Application Priority Data
Jun. 20, 2014    (JP) .................................. 2014-127519

(51) Int. Cl.
*B60C 7/10*    (2006.01)
*B60C 7/18*    (2006.01)
(Continued)

(52) U.S. Cl.
CPC ................ *B60C 7/102* (2013.01); *B60C 7/18* (2013.01); *B60B 5/02* (2013.01); *B60B 9/26* (2013.01);
(Continued)

(58) Field of Classification Search
CPC .. B60C 7/102; B60C 7/10; B60C 7/22; B60C 7/18; B60C 2007/146; B60C 2007/107
See application file for complete search history.

(56) References Cited

U.S. PATENT DOCUMENTS 3,664,404 A * 5/1972 Twardzik .................. B60C 9/26
152/528
8,104,524 B2 * 1/2012 Manesh .................... B60B 9/00
152/301

(Continued)

FOREIGN PATENT DOCUMENTS

JP    2008-260514 A    10/2008
JP    2011-178308 A    9/2011
(Continued)

OTHER PUBLICATIONS

Extended European Search Report for European Application No. 15810351.5, dated Dec. 13, 2017.

*Primary Examiner* — Kip T Kotter
(74) *Attorney, Agent, or Firm* — Birch, Stewart, Kolasch & Birch, LLP (57) ABSTRACT

An air-less tire has, formed on a tread ring: tread rubber for forming a ground contact surface; an outer reinforcement cord layer provided nearest the tread rubber; an inner reinforcement cord layer provided inside the outer reinforcement cord layer in the radial direction of the tire; and a shear rubber layer provided between the outer reinforcement cord layer and the inner reinforcement cord layer. The outer reinforcement cord layer includes: a first cord layer having first cords arranged tilted relative to the circumferential direction of the tire; and a second cord layer provided outside the first cord layer in the radial direction of the tire and having second cords arranged tilted relative to the circumferential direction of the tire in the direction opposite the direction in which the first cords are tilted. The inner (Continued)

reinforcement cord layer includes a third cord layer having third cords arranged parallel to the circumferential direction or the axial direction of the tire.

19 Claims, 6 Drawing Sheets

(51) Int. Cl.
  *B60C 9/18* (2006.01)
  *B60B 5/02* (2006.01)
  *B60B 9/26* (2006.01)
  *B60B 19/12* (2006.01)
  *B60C 7/14* (2006.01)

(52) U.S. Cl.
  CPC ......... *B60B 19/12* (2013.01); *B60C 2007/146* (2013.01); *B60C 2009/1871* (2013.01)

(56) References Cited

U.S. PATENT DOCUMENTS

| | | | |
|---|---|---|---|
| 2003/0121581 A1* | 7/2003 | Thompson | B60O 7/22 152/301 |
| 2004/0187996 A1* | 9/2004 | Grah | B60C 1/00 152/516 |
| 2007/0267116 A1 | 11/2007 | Rhyne et al. | |
| 2008/0314486 A1* | 12/2008 | Manesh | B60O 7/14 152/328 |
| 2011/0011506 A1* | 1/2011 | Manesh | B60O 7/12 152/328 |
| 2011/0079335 A1* | 4/2011 | Manesh | B60O 7/12 152/310 |
| 2012/0193004 A1* | 8/2012 | Anderson | B60O 7/105 152/310 |
| 2012/0318417 A1* | 12/2012 | Dotson | B60O 7/10 152/17 |
| 2014/0326374 A1* | 11/2014 | Cron | B60O 7/102 152/5 |
| 2015/0352901 A1* | 12/2015 | Mori | B60C 9/006 152/526 |

FOREIGN PATENT DOCUMENTS

| | | |
|---|---|---|
| WO | WO 2011/112920 A1 | 9/2011 |
| WO | WO 2013/095499 A1 | 6/2013 |

\* cited by examiner

AIR-LESS TIRE

TECHNICAL FIELD

The present invention relates to an air-less tire having lightweight and excellent steering stability.

BACKGROUND ART

As air-less tires, the construction that includes an annular tread ring having a ground contact surface, a hub and a plurality of radially arranged spoke plates connecting the hub and an axle has been proposed (see Patent Literature 1, for example).

In such an air-less tire, it is requested to improve steering stability with weight saving.

CITATION LIST

Patent Literature

Patent Literature 1: Japanese Unexamined Patent Application Publication No. 2008-260514

The tread ring of the air-less tire disclosed in the above mentioned Patent Literature 1 includes an outer reinforcing cord layer disposed nearest to a tread rubber and an inner reinforcing cord layer disposed radially inward of the outer reinforcing cord layer. A shear rubber layer is also disposed between the outer reinforcing cord layer and the inner reinforcing cord layer. Unfortunately, in the above mentioned tread ring, since the respective one of the outer reinforcing cord layer and the inner reinforcing cord layer are formed of a pair of cord layers each having tire cords which are inclined with respect to the tire circumferential direction, it may be difficult to reduce the weight.

In order to improve steering stability of air-less tires, it is important to increase rigidity of the ground contact surface of the tread ring as with pneumatic tires. In general, the inner surface of the tread ring in the tire radial direction may have a relatively high rigidity by being supported by the spokes. However, it is difficult to increase rigidity of the ground contact surface which is located on the outer surface of the tread ring in the tire radial direction. Thus, in the above mentioned air-less tire, it would be difficult to improve steering stability while reducing its weight.

SUMMARY OF INVENTION

Technical Problem

The present invention has been made in view of the above circumstances, and has a major object to provide an air-less tire having lightweight and excellent steering stability.

Solution to Problem

The present invention provides an air-less tire including an annular tread ring having a ground contact surface, a hub to be fixed to an axle and disposed radially inward of the tread ring, and spokes connecting the tread ring and the hub. The tread ring includes a tread rubber forming the ground contact surface, an outer reinforcing cord layer disposed proximately to the tread rubber, an inner reinforcing cord layer disposed radially inward of the outer reinforcing cord layers and a shear rubber layer disposed between the outer reinforcing cord layer and the inner reinforcing cord layer. The outer reinforcing cord layer, with respect to the number of plies, is greater than the inner reinforcing cord layer.

In the air-less tire in accordance with the present invention, it is preferable that the outer reinforcing cord layer includes a first cord ply having first cords inclining with respect to a tire circumferential direction and a second cord ply disposed radially outward of the first cord ply and having second cords inclining in an opposite direction to the first cords with respect to the tire circumferential direction, and that the inner reinforcing cord layer includes a third cord ply having third cords arranged in parallel with either the tire circumferential direction or a tire axial direction.

In the air-less tire in accordance with the present invention, it is preferable that the first cords are arranged in a line symmetrical manner to the second cords with respect to a tire circumferential line.

In the air-less tire in accordance with the present invention, it is preferable that the outer reinforcing cord layer further includes a fourth cord ply having forth cords, and the fourth cord ply is disposed radially outward of the second cord ply.

In the air-less tire in accordance with the present invention, it is preferable that the fourth cords are arranged in parallel with the tire circumferential direction and that the fourth cords have an elastic modulus equal to or less than those of the first cords and the second cords.

In the air-less tire in accordance with the present invention, it is preferable that the outer reinforcing cord layer further includes a fifth cord ply having fifth cords, and the fifth cord ply is disposed radially inward of the first cord ply.

In the air-less tire in accordance with the present invention, it is preferable that the fifth cords are arranged in parallel with the tire circumferential direction.

In the air-less tire in accordance with the present invention, it is preferable that the third cords are arranged in parallel with the tire circumferential direction.

In the air-less tire in accordance with the present invention, it is preferable that angles of the first cords are in a range of from 5 to 85 degrees with respect to the tire circumferential direction.

In the air-less tire in accordance with the present invention, it is preferable that distances in a tire radial direction between the first cords and the third cords are not less than 3 mm.

In the air-less tire in accordance with the present invention, it is preferable that the shear rubber layer has a complex modulus equal to or more than 2 MPa.

Advantageous Effects of Invention

An air-less tire according to the present invention includes the tread ring including the tread rubber forming the ground contact surface, the outer reinforcing cord layer disposed proximately to the tread rubber, the inner reinforcing cord layer disposed radially inward of the outer reinforcing cord layer and the shear rubber layer disposed between the outer reinforcing cord layer and the inner reinforcing cord layer. The shape of the tread ring is maintained by the outer reinforcing cord layer and the inner reinforcing cord layer so as to support the load acting on the air-less tire. The shear rubber layer mitigates shear stress acting between the outer reinforcing cord layer and the inner reinforcing cord layer.

In the present invention, since the outer reinforcing cord layer which is disposed proximately to the tread rubber forming the ground contact surface, with respect to the number of plies, is greater than the inner reinforcing cord layer which is disposed inward of the shear rubber layer, the rigidity of the ground contact surface can easily be enhanced. Furthermore, since the inner reinforcing cord layer is configured to be smaller than the outer reinforcing cord layer with respect to the number of plies, saving weight can easily be achieved. The radially inner surface of the tread ring can obtain sufficient rigidity since it is restrained by the spokes.

DESCRIPTION OF EMBODIMENTS

Figure 1:
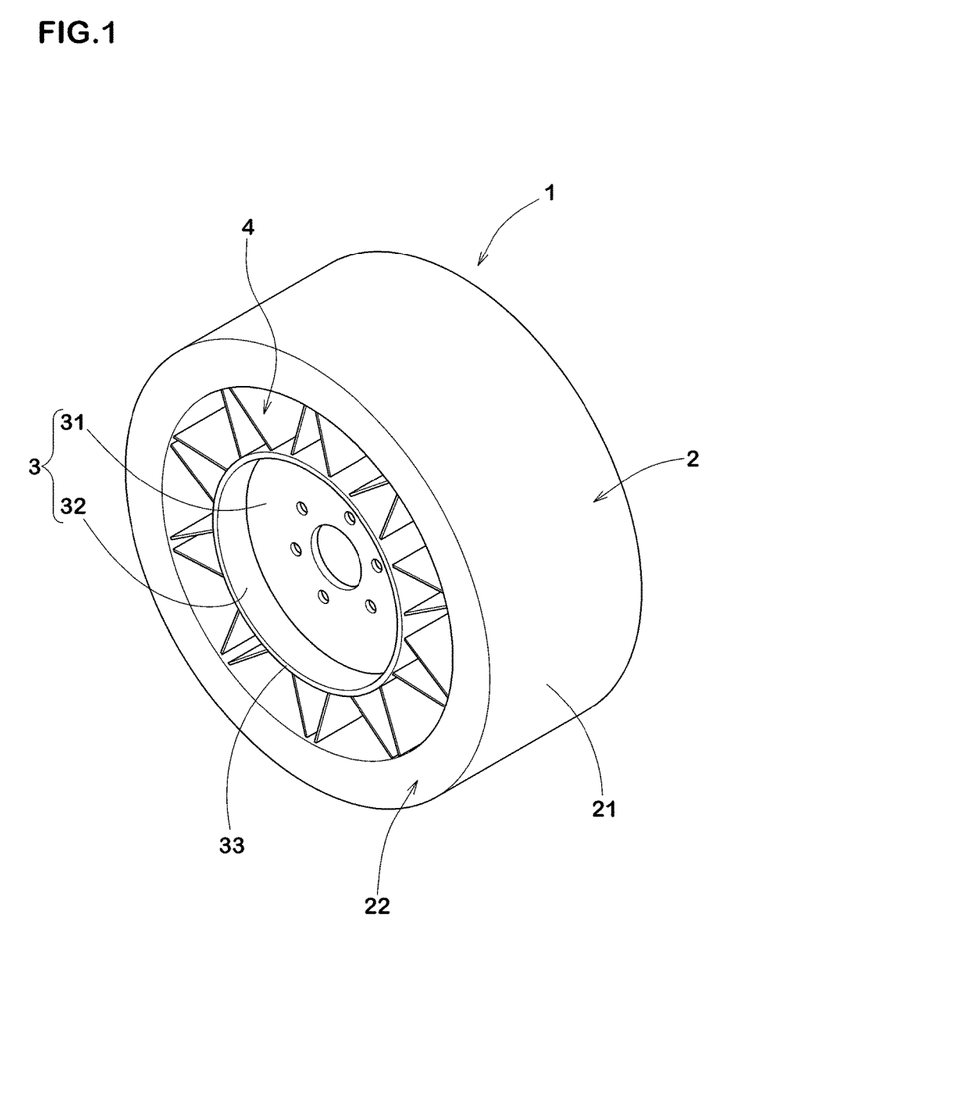
FIG. 1 is a perspective view of an air-less tire in accordance with the present invention.

An embodiment of the present invention will be explained below with reference to the accompanying drawings. FIG. 1 is a perspective view of an air-less tire 1 in accordance with the present embodiment. As illustrated in FIG. 1, the air-less tire 1 in accordance with the present embodiment includes an annular tread ring 2 having a ground contact surface 21, a hub 3 to be fixed to an axle and disposed radially inward of the tread ring 2 and spokes 4 connecting the tread ring 2 and the hub 3. In this embodiment, the air-less tire 1 is illustrated as a tire for passenger car.

As illustrated in FIG. 1, the hub 3 includes a disk portion 31 to be fixed to an axle and a cylindrical portion 32 formed on the outer periphery of the disk portion 31. The cylindrical portion 32 has a sidewall 33 formed on an edge. The sidewall 33 is formed as a plane that is perpendicular to the hub center axis A3. The hub 3, for example, is made of a metallic material such as steel, aluminum alloy, magnesium alloy and the like same as conventional tire wheels.

The spokes 4 are formed by cast molding of high polymer material. The spokes 4 have a plate shape and are arranged in a tire circumferential direction.

Figure 2:
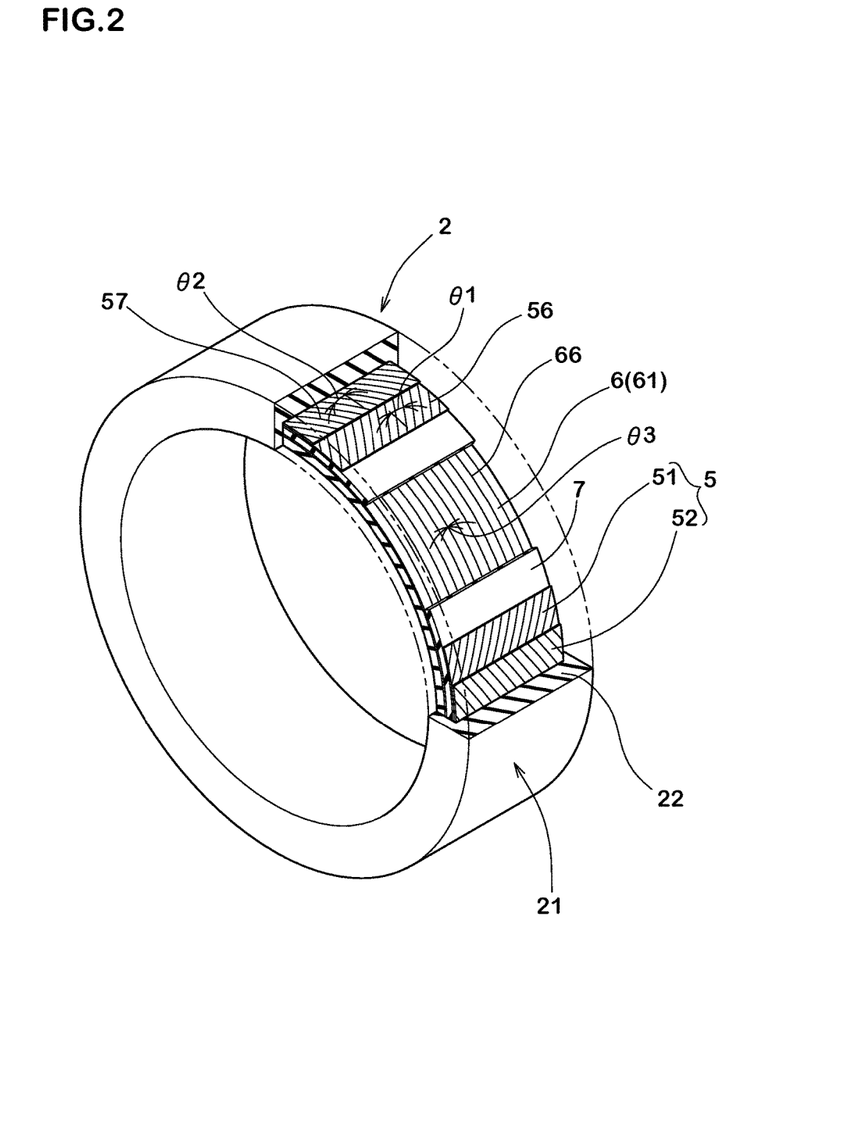
FIG. 2 is a perspective view of a tread ring of FIG. 1.
Figure 3:
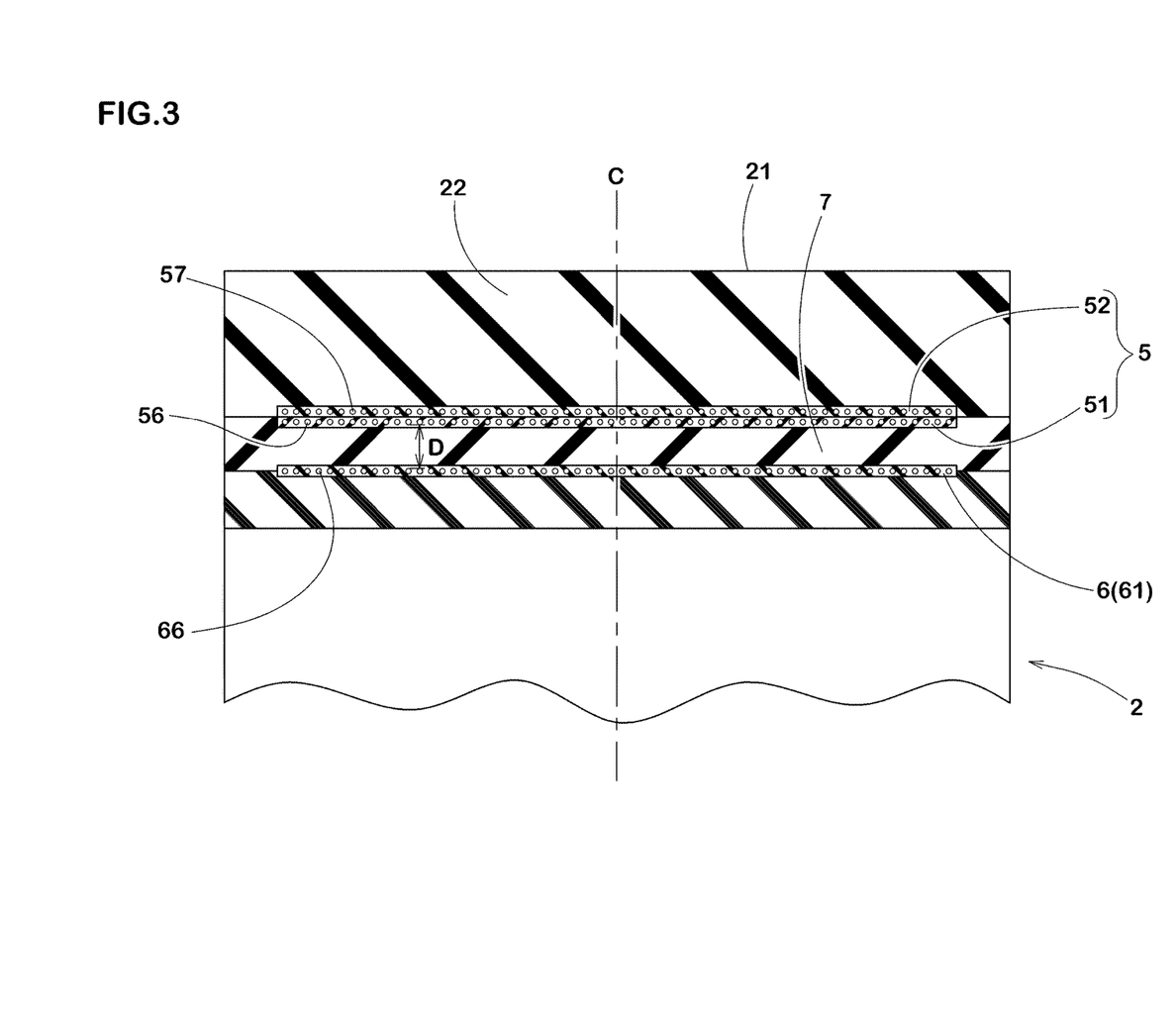
FIG. 3 is a cross-sectional view of the tread ring of FIG. 2.

FIG. 2 and FIG. 3 illustrate the tread ring 2. The tread ring 2 includes a tread rubber 22 forming the ground contact surface 21, an outer reinforcing cord layer 5 disposed proximately to the tread rubber 22, an inner reinforcing cord layer 6 disposed radially inward of the outer reinforcing cord layer 5, and a shear rubber layer 7 disposed between the outer reinforcing cord layer 5 and the inner reinforcing cord layer 6. The shape of the tread ring 2 is maintained by the outer reinforcing cord layer 5 and the inner reinforcing cord layer 6 so as to support the load acting on the air-less tire 1.

The ground contact surface 21, which is an outer surface of the tread ring 2, may be provided with tread grooves (not illustrated) in various patterns. For the tread rubber 22, a rubber composition that generates high friction force to the ground with excellent wear resistance can suitably be employed.

In this embodiment, the outer reinforcing cord layer 5 which is disposed proximately to the tread rubber 22, with respect to the number of plies, is greater than the inner reinforcing cord layer 6 which is disposed inward of the shear rubber layer 7. Thus, the rigidity of the ground contact surface 21 can easily be enhanced. Furthermore, since the inner reinforcing cord layer 6 is configured to be smaller than the outer reinforcing cord layer 5 with respect to the number of plies, saving weight can easily be achieved. The radially inner surface of the tread ring 2 can obtain sufficient rigidity since it is restrained by the spokes 4.

The outer reinforcing cord layer 5 is configured to include a first cord ply 51 and a second cord ply 52 disposed radially outward of the first cord ply 51.

In this embodiment, widths of the first cord ply 51 and the second cord ply 52 are equal from one another in the tire axial direction. The widths of the first cord ply 51 and the second cord ply 52 may be different from one another. In this case, the difference in width between the cord plies is preferably tens of millimeters or less.

The first cord ply 51 includes a plurality of first cords 56. The first cords 56 are oriented at angles $\theta 1$ with respect to the tire circumferential direction. The first cords 56 are coated with topping rubber.

The second cord ply 52 includes a plurality of second cords 57. The second cords 57 are oriented at angles $\theta 2$ with respect to the tire circumferential direction in an opposite direction to the first cords 56. The second cords 57 are coated with topping rubber.

For the first cords 56 and the second cords 57, a steel cord and an organic fiber cord, which are the same as belt cords of pneumatic tires, can be employed. In case of an organic fiber cord, a high modulus fiber having high strength and elastic modulus such as aramid, polyethylene naphthalate (PEN), polyethylene terephthalate (PET) and the like can suitably be employed. Such a steel cord and an organic fiber cord can exhibit sufficient strength without occurring yielding by tensile and compressive stresses which act on the cords when the tire is subjected to load.

Since the first cords 56 and the second cords 57 are inclined with respect to the tire circumferential direction in an opposite direction from one another, the rigidity of the outer reinforcing cord layer 5 can be increased to enhance the tread ring 2 effectively. Such an outer reinforcing cord layer 5 can exhibit high torsional resistance in a plane of the layer as with belt cords of pneumatic tires when the air-less tire 1 is given a slip angle, and thus brings an excellent cornering performance.

The inner reinforcing cord layer 6 is configured to include a third cord ply 61. The third cord ply 61 includes a plurality of third cords 66. The third cords 66 are coated with topping rubber.

In this embodiment, the third cords 66 are oriented in parallel with the tire circumferential direction. Here, the "parallel with the tire circumferential direction" means that the third cords 66 are substantially parallel with the tire circumferential direction. In view of manufacturing tolerance, the angles $\theta 3$ of third cords 66 with respect to the tire circumferential direction, for example, are about 0 degrees plus or minus 5 degrees. For the third cords 66, the above mentioned organic fibers such as aramid, polyethylene naphthalate, polyethylene terephthalate and the like can suitably be employed, for example.

The rigidity of the tread ring 2 in the tire circumferential direction can be enhanced by the inner reinforcing cord layer 6 with the third cords 66. Thus, the shape of the ground contact surface 21 upon braking and accelerating becomes stable, thereby improving braking performance and traction performance. Furthermore, the third cord ply 61 which includes the third cords 66 oriented in parallel with the tire circumferential direction can ensure by itself symmetry with respect to a tire circumferential line. Accordingly, weight saving of the tread ring 2 as well as improved steering stability of the air-less tire 1 can be achieved.

Figure 4:
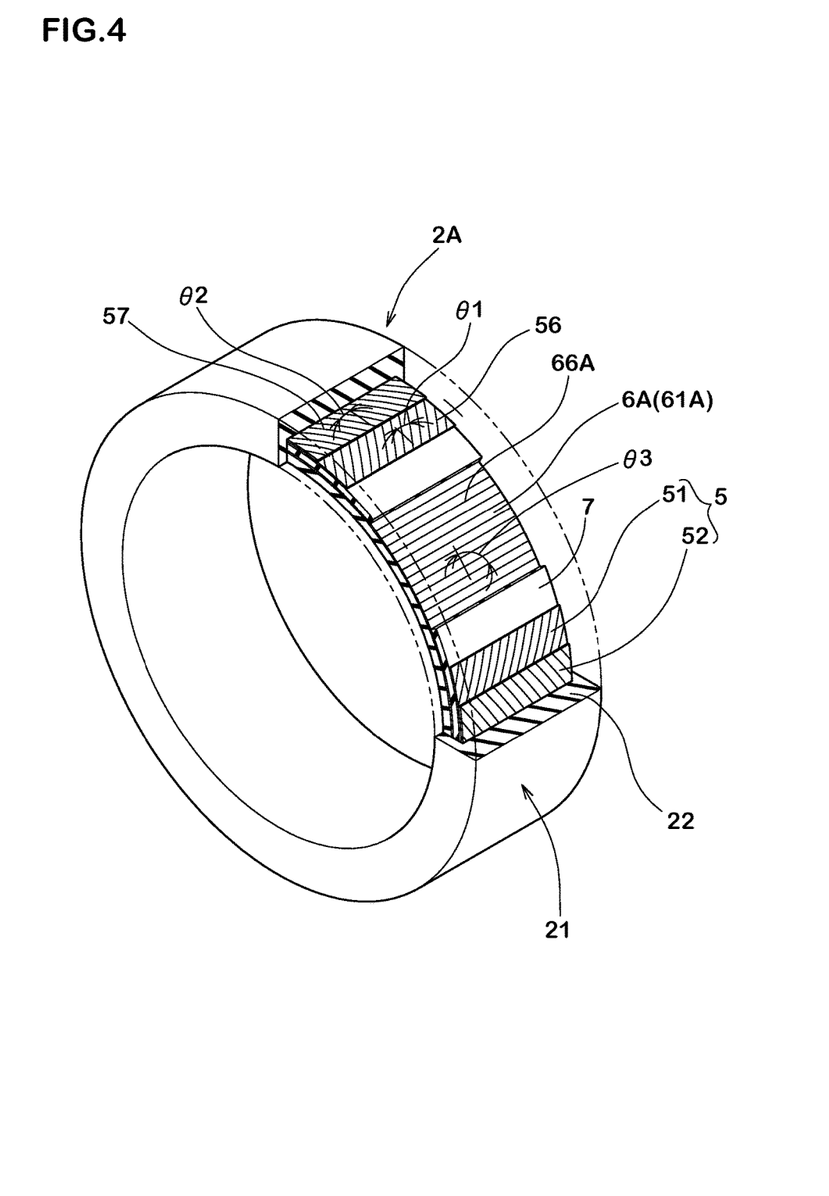
FIG. 4 is a perspective view of the tread ring illustrating another embodiment of an inner reinforcing cord layer of FIG. 2.

FIG. 4 illustrates another embodiment of the third cord ply 61A. As illustrated in FIG. 4, the third cords 66A may be oriented in parallel with the tire axial direction. Here, the "parallel with the tire axial direction" means that the third cords 66A are substantially parallel with the tire axial direction. In view of manufacturing tolerance, the third cords 66A can be oriented at angles θ3 with respect to the tire axial direction is about 90 degrees plus or minus 5 degrees.

The rigidity of the tread ring 2A in the tire axial direction can be enhanced by the third cords 66A which are oriented in parallel with the tire axial direction. Thus, the shape of the ground contact surface 21 when the air-less tire 1 is subject to a large slip angle becomes stable, thereby improving steering stability. Furthermore, the third cord ply 61A which includes the third cords 66A oriented in parallel with the tire axial direction can ensure by itself symmetry with respect to the tire circumferential direction. Accordingly, in the same manner as described above, weight saving of the tread ring 2A as well as improved steering stability of the air-less tire 1 can be achieved.

As illustrated in FIGS. 2 and 4, the first cords 56 are preferably oriented in a line symmetrical manner to the second cords 57 with respect to a tire circumferential line. The first cords 56 and the second cords 57 ensure symmetry of the outer reinforcing cord layer 5 with respect to a tire circumferential line. Thus, steering stability of the air-less tire 1 can be improved.

In pneumatic tires, belt cord angles with respect to the tire circumferential direction are generally limited in a certain ranges in order to suppress growth of tread portion due to internal pressure. On the other hand, since the air-less tire 1 in accordance with the present embodiment is not necessary to consider the internal pressure, angles θ1 and θ2 of the first cords 56 and the second cords 57 respectively with respect to the tire circumferential direction can be determined in a wide range.

It is preferable that the angles θ1 of the first cords 56, for example, are in a range of from 5 to 85 degrees with respect to the tire circumferential direction. When the angles θ1 are less than 5 degrees, the rigidity of the tread ring 2 in the tire axial direction tends to be insufficient, and thus cornering performance may be affected. On the other hand, when the angles θ1 are more than 85 degrees, the rigidity of the tread ring 2 in the tire circumferential direction tends to be insufficient, and thus straight traveling ability and cornering performance with small slip angles may be affected.

Similarly, it is preferable that the angles θ2 of the second cords 57, for example, are in a range of from 5 to 85 degrees with respect to the tire circumferential direction. When the angles θ2 are less than 5 degrees, the rigidity of the tread ring 2 in the tire axial direction tends to be insufficient, and thus cornering performance may be affected. On the other hand, when the angles θ2 are more than 85 degrees, the rigidity of the tread ring 2 in the tire circumferential direction tends to be insufficient, and thus straight traveling ability and cornering performance with small slip angles may be affected. In this embodiment, since the first cords 56 are arranged in a line symmetrical manner to the second cords 57 with respect to a tire circumferential line, the above angles θ1 are substantially the same as the angles θ2 with respect to their absolute values.

In this embodiment, the first cord ply 51 is disposed on the innermost side in the tire radial direction among the outer reinforcing cord layer 5. Alternately, a single or plurality of cord plies (not illustrated) may be disposed under the first cord ply 51. These cord plies can suppress the deformation of the tread ring 2 to improve load resistance of the air-less tire 1.

When a plurality of cord plies are disposed, the cords embedded in each ply are preferably arranged in a line symmetrical manner with respect to a tire circumferential line to the cords of adjacent another ply. These cords can ensure symmetrical property of the outer reinforcing cord layer 5 with respect to a tire circumferential line. Thus, steering stability of the air-less tire 1 can be improved.

When a single cord ply is disposed, the cords embedded in the ply are preferably arranged in parallel with the tire circumferential direction. These cords can also ensure symmetrical property of the outer reinforcing cord layer 5 with respect to a tire circumferential line using a single ply. Thus, steering stability of the air-less tire 1 can be improved while reducing the weight of the tread ring 2.

The shear rubber layer 7 is disposed between two cord-plies which are located farthest in the tire radial direction among the plies constituting the outer reinforcing cord layer 5 and the inner reinforcing cord layer 6. In this embodiment, the shear rubber layer 7 is disposed between the first cord ply 51 and the third cord ply 61.

The shear rubber layer 7 can mitigate the shear strain between the outer reinforcing cord layer 5 and the inner reinforcing cord layer 6. The shear rubber layer 7, for example, is disposed at a location including the neutral axis where tensile stress and compressive stress are not subject when the air-less tire 1 is loaded with a vertical load.

It is preferable that the shear rubber layer 7 is configured to include a rubber having a complex modulus E* of not less than 2 MPa. When the complex modulus E* of the rubber is less than 2 MPa, shear strain in the shear rubber layer 7 tends to be large and thus the durability of the tread ring 2 may be affected.

The shear rubber layer 7 may be made of a rubber material that has the same composition as that of the topping rubber for coating the first cords 56 and the third cords 66. In this case, the shear rubber layer 7 may be configured by thickening adjacent topping rubber layers of the first cord ply 51 and the third cord ply 61 without providing any independent rubber layer between the outer reinforcing cord layer 5 and the inner reinforcing cord layer 6.

As illustrated in FIG. 3, since the shear rubber layer 7 with a certain thickness is provided between the first cord ply 51 and the third cord ply 61, the first cords 56 and the third cords 66 are sufficiently isolated in the tire radial direction, and thus the shear stress between the first cord ply 51 and the third cord ply 61 can be mitigated. It is preferable that the distances D in the tire radial direction between the first cords 56 and the third cords 66 are equal to or more than 3 mm. When the distances D are less than 3 mm, the shear stress on the shear rubber layer 7 tends to be large and may the durability of the tread ring 2 may be affected.

The tread ring 2 as illustrated in FIGS. 2 to 4, for example, may be manufactured in such a manner that a green tread ring is molded previously and then the green tread ring is vulcanized in a vulcanization mold. The green tread ring is formed by winding sheet-like members in stages on a cylindrical forming drum in the tire circumferential direction to form the respective third cord ply 61, shear rubber layer 7, first cord ply 51, second cord ply 52, the tread rubber 22 and the like.

Figure 5:
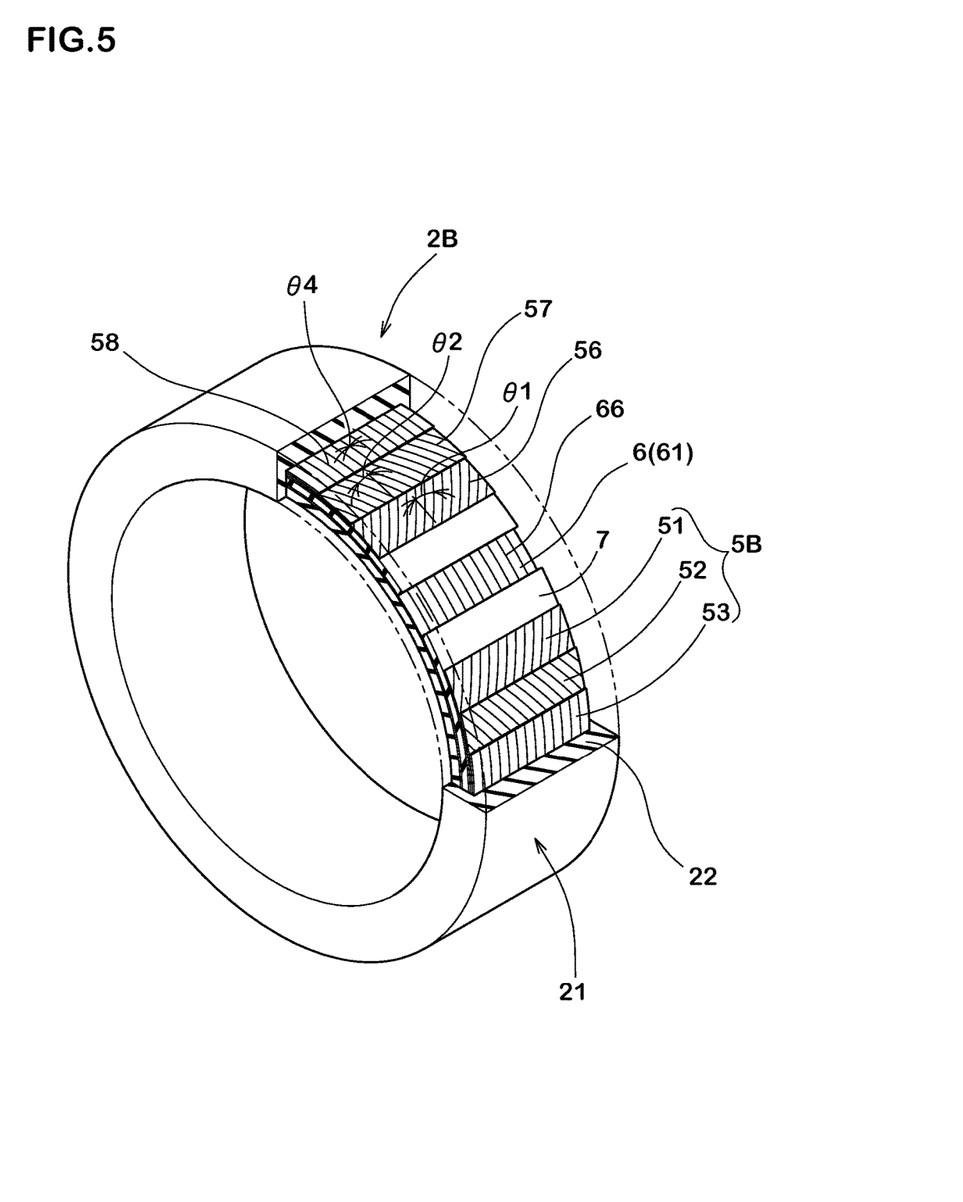
FIG. 5 is a perspective view of the tread ring illustrating another embodiment of an outer reinforcing cord layer of FIG. 2.

FIG. 5 illustrates another embodiment of the outer reinforcing cord layer 5B. Note that no explanations for the same elements as the previous embodiment are given. As illustrated in FIG. 5, the outer reinforcing cord layer 5B further includes a fourth cord ply 53 having fourth cords 58 disposed outside the second cord ply 52 in the tire radial direction. The fourth cord ply 53 can reinforce the tread ring 2B together with the first cord ply 51 and the second cord ply 52. The outer reinforcing cord layer 5 as illustrated in FIG. 5, for example, is suitable to use for commercial tires which is subject to a large load since it increases rigidity of the tread ring 2B.

It is preferable that the fourth cords 58 are oriented in parallel with the tire circumferential direction, i.e. the angles $\theta 4$ are 0 degrees plus or minus 5 degrees with respect to the tire circumferential direction, same as the third cords 66. The fourth cords 58 can enhance rigidity of the tread ring 2B in the tire circumferential direction. Thus, the shape of the ground contact surface 21 upon braking and accelerating becomes stable, thereby improving braking performance and traction performance. Furthermore, the fourth cord ply 53 with the fourth cords 58 oriented in parallel with the tire circumferential direction can ensure by itself symmetry with respect to a tire circumferential line. Accordingly, weight saving of the tread ring 2 as well as improved steering stability of the air-less tire 1 can be achieved.

It is preferable that an elastic modulus E4 of the fourth cords 58 is equal to or less than the elastic moduli E1 and E2 of the first cords 56 and the second cords 57, respectively. When the elastic modulus E4 of the fourth cords 58 exceeds the elastic moduli E1 and E2 of the first cords 56 and the second cords 57 respectively, the rigidity of the tread ring 2B in the tire axial direction decreases in relation to that of the tire circumferential direction, and thus the cornering performance may be affected. It is preferable that an organic fiber cord such as nylon and the like can be employed for the fourth cords 58, for example.

Figure 6:
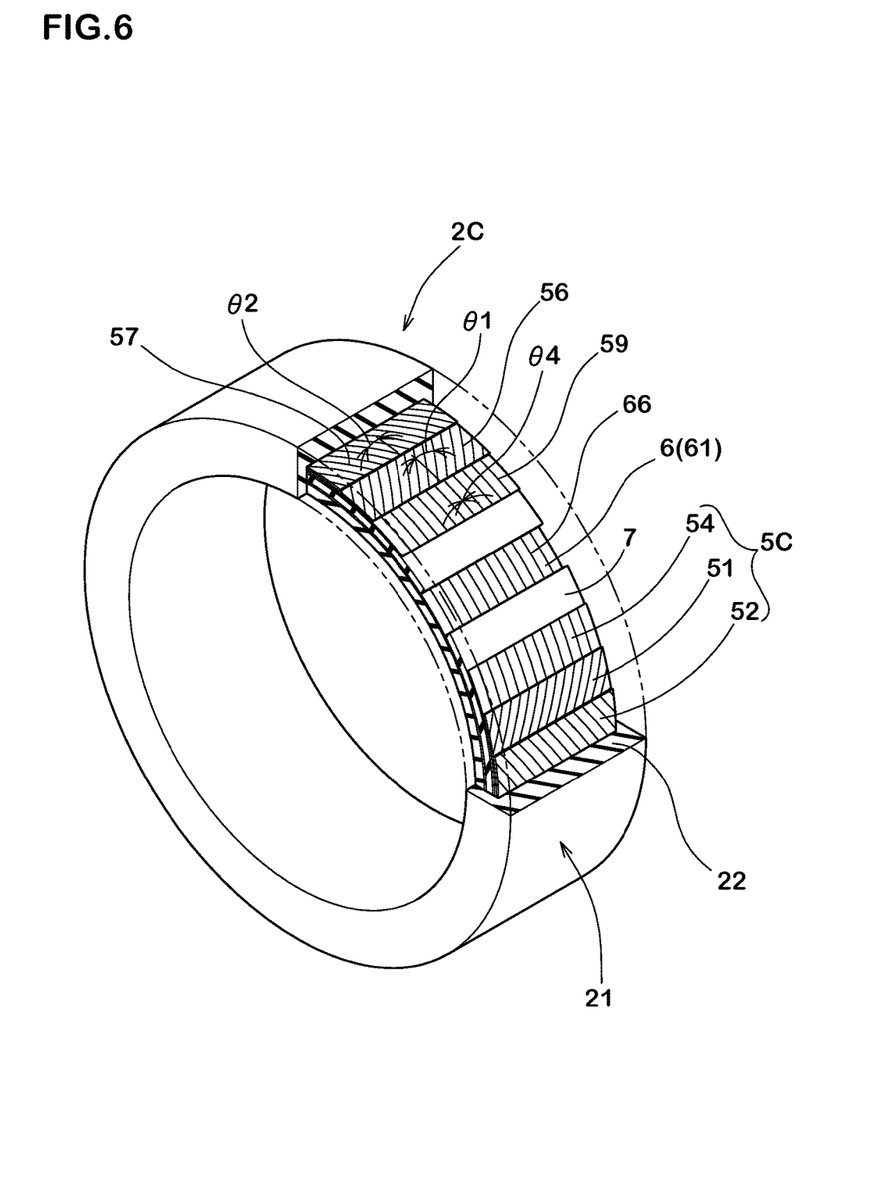
FIG. 6 is a perspective view of the tread ring illustrating yet another embodiment of an outer reinforcing cord layer of FIG. 2.

FIG. 6 illustrates yet another embodiment of the outer reinforcing cord layer 5C. Note that no explanations for the same elements as the previous embodiment are given. As illustrated in FIG. 6, the outer reinforcing cord layer 5C further includes a fifth cord ply 54 having fifth cords 59 disposed inside the first cord ply 51 in the tire radial direction. The fifth cord ply 54 can reinforce the tread ring 2C together with the first cord ply 51 and the second cord ply 52. The outer reinforcing cord layer 5 as illustrated in FIG. 6, for example, is suitable to use for commercial tires which is subject to a large load since the layer increases rigidity of the tread ring 2C.

It is preferable that the fifth cords 59 are oriented in parallel with the tire circumferential direction, i.e. the angles $\theta 4$ are 0 degrees plus or minus 5 degrees with respect to the tire circumferential direction, same as the third cords 66. The fifth cords 59 can enhance rigidity of the tread ring 2C in the tire circumferential direction. Thus, the shape of the ground contact surface 21 upon braking and accelerating becomes stable, thereby improving braking performance and traction performance. Furthermore, the fifth cord ply 54 with the fifth cords 59 oriented in parallel with the tire circumferential direction can ensure by itself symmetry with respect to a tire circumferential line. Accordingly, weight saving of the tread ring 2C as well as improved steering stability of the air-less tire 1 can be achieved.

By combining the embodiment of outer reinforcing cord layer 5B illustrated in FIG. 5 and the embodiment of outer reinforcing cord layer 5C illustrated in FIG. 6, the fourth cords 58 may be arranged outside the second cord ply 52 in the tire radial direction and the fifth cords 59 may be arranged inside the first cord ply 51. Such a configuration may further increase the rigidity of the tread ring 2B or 2C.

While the particularly preferable embodiments in accordance with the present invention have been described in detail, the present invention is not limited to the illustrated embodiments, but can be modified and carried out in various aspects.

EXAMPLE

Air-less tires having a basic structure illustrated in FIGS. 1 and 2 were manufactured based on the details shown in Table 1, and then appearance, steering stability, weight and durability thereof were evaluated.

Appearance Test:

An observer evaluated distortion on the tread rings of each of the air-less tires by his sense.

Steering Stability Test:

A small electric vehicle with each test air-less tire was driven by a test driver without any other passengers to evaluate performance such as steering response, rigidity feeling, grip and the like by his sense. The test results are indicated using a score based on Ex. 1 being 100, wherein the larger the value, the better the performance is. Note that steering stability and durability tests were not conducted for the air-less tires which had been identified as having distortion in the appearance test.

Weight Measurement:

Each weight of the tread rings was measured. The test results are indicated using an index based on Ex. 1 being 100, wherein the larger the value, the lighter the weight is.

Durability Test:

A traveling distance of each air-less tire until it is injured was measured using a drum tester under the conditions at speed of 40 km/hr with vertical load of 1.17 kN. The test results are indicated using an index based on Ex. 1 being 100, wherein the larger the value, the better the durability is.

TABLE 1

|  | Ref. 1 | Ref. 2 | Ref. 3 | Ref. 4 | Ref. 5 | Ref. 6 |
| --- | --- | --- | --- | --- | --- | --- |
| First cord angles θ1 (deg.) | 0 | 21 | 21 | 21 | 21 | 21 |
| Second cord angles θ2 (deg.) | 0 | −21 | −21 | −21 | −21 | −21 |
| Third cord ply(plies) | 1 ply | 1 ply | 2 plies | 3 plies | 3 plies | 4 plies |
| Third cord angles θ3 (deg.) | 21 | 21 | 21/−21 | 21/−21/21 | 0 | 21/−21/21/−21 |
| Fourth cord ply(plies) | absence | absence | absence | absence | absence | absence |
| Fourth cord angles θ4 (deg.) | — | — | — | — | — | — |
| Fourth cord elastic modulus (relative relation between first cords and second cords) | — | — | — | — | — | — |
| Fifth cord ply(plies) | absence | absence | absence | 1 ply | 1 ply | 1 ply |
| Fifth cord angles θ5 (deg.) | — | — | — | 0 | 0 | 0 |

TABLE 1-continued

| | | | | | | |
|---|---|---|---|---|---|---|
| Outer reinforcing cord layer | 2 plies | 2 plies | 2 plies | 3 plies | 3 plies | 3 plies |
| Inner reinforcing cord layer | 1 ply | 1 ply | 2 ply | 3 plies | 3 plies | 4 plies |
| Distances D (mm) | 4 | 4 | 4 | 4 | 4 | 4 |
| Complex modulus E* (MPa) | 10 | 10 | 10 | 10 | 10 | 10 |
| Appearance performance (presence or absence of distortion) | presence | presence | absence | presence | absence | absence |
| Steering stability (score) | No test | No test | 100 | No test | 100 | 100 |
| Weight (index) | 100 | 100 | 90 | 70 | 70 | 60 |
| Durability (index) | No test | No test | 100 | No test | 120 | 120 |

| | Ex. 1 | Ex. 2 | Ex. 3 | Ex. 4 |
|---|---|---|---|---|
| First cord angles $\theta_1$ (deg.) | 21 | 22 | 21 | 21 |
| Second cord angles $\theta_2$ (deg.) | −21 | −20 | −21 | −21 |
| Third cord ply(plies) | 1 ply | 1 ply | 1 ply | 1 ply |
| Third cord angles $\theta_3$ (deg.) | 0 | 0 | 0 | 0 |
| Fourth cord ply(plies) | Absence | absence | 1 ply | 1 ply |
| Fourth cord angles $\theta_4$ (deg.) | — | — | 0 | 0 |
| Fourth cord elastic modulus (relative relation between first cords and second cords) | — | — | $E_4 \leq E_1$ $E_4 \leq E_2$ | $E_4 > E_1$ $E_4 > E_2$ |
| Fifth cord ply(plies) | absence | absence | absence | Absence |
| Fifth cord angles $\theta_5$ (deg.) | — | — | — | — |
| Outer reinforcing cord layer | 2 plies | 2 plies | 3 plies | 3 plies |
| Inner reinforcing cord layer | 1 ply | 1 ply | 1 ply | 1 ply |
| Distances D (mm) | 4 | 4 | 4 | 4 |
| Complex modulus E* (MPa) | 10 | 10 | 10 | 10 |
| Appearance performance (presence or absence of distortion) | absence | absence | absence | Absence |
| Steering stability (score) | 100 | 95 | 100 | 95 |
| Weight (index) | 100 | 100 | 90 | 90 |
| Durability (index) | 100 | 100 | 110 | 110 |

| | Ex. 5 | Ex. 6 | Ex. 7 | Ex. 8 | Ex. 9 | Ex. 10 |
|---|---|---|---|---|---|---|
| First cord angles $\theta_1$ (deg.) | 21 | 21 | 21 | 21 | 21 | 3 |
| Second cord angles $\theta_2$ (deg.) | −21 | −21 | −21 | −21 | −21 | −3 |
| Third cord ply(plies) | 1 ply | 2 ply | 1 ply | 1 ply | 1 ply | 1 ply |
| Third cord angles $\theta_3$ (deg.) | 0 | 21/−21 | 0 | 0 | 90 | 0 |
| Fourth cord ply(plies) | absence | absence | absence | absence | absence | absence |
| Fourth cord angles $\theta_4$ (deg.) | — | — | — | — | — | — |
| Fourth cord elastic modulus (relative relation between first cords and second cords) | — | — | — | — | — | — |
| Fifth cord ply(plies) | 1 ply | 1 ply | 2 plies | 2 plies | absence | absence |
| Fifth cord angles $\theta_5$ (deg.) | 0 | 0 | 21/−21 | 0/0 | — | — |
| Outer reinforcing cord layer | 3 plies | 3 plies | 4 plies | 4 plies | 2 plies | 2 plies |
| Inner reinforcing cord layer | 1 ply | 2 plies | 1 ply | 1 ply | 1 ply | 1 ply |
| Distances D (mm) | 4 | 4 | 4 | 4 | 4 | 4 |
| Complex modulus E* (MPa) | 10 | 10 | 10 | 10 | 10 | 10 |
| Appearance performance (presence or absence of distortion) | absence | absence | absence | absence | absence | absence |
| Steering stability (score) | 100 | 100 | 100 | 100 | 97 | 95 |
| Weight (index) | 90 | 80 | 80 | 80 | 100 | 100 |
| Durability (index) | 120 | 115 | 120 | 120 | 95 | 100 |

| | Ex. 11 | Ex. 12 | Ex. 13 | Ex. 14 |
|---|---|---|---|---|
| First cord angles $\theta_1$ (deg.) | 5 | 7 | 80 | 85 |
| Second cord angles $\theta_2$ (deg.) | −5 | −7 | −80 | −85 |
| Third cord ply(plies) | 1 ply | 1 ply | 1 ply | 1 ply |
| Third cord angles $\theta_3$ (deg.) | 0 | 0 | 0 | 0 |
| Fourth cord ply(plies) | absence | absence | absence | absence |
| Fourth cord angles $\theta_4$ (deg.) | — | — | — | — |
| Fourth cord elastic modulus (relative relation between first cords and second cords) | — | — | — | — |
| Fifth cord ply(plies) | absence | absence | absence | absence |
| Fifth cord angles $\theta_5$ (deg.) | — | — | — | — |
| Outer reinforcing cord layer | 2 plies | 2 plies | 2 plies | 2 plies |
| Inner reinforcing cord layer | 1 ply | 1 ply | 1 ply | 1 ply |

TABLE 1-continued

|  | | | | |
|---|---|---|---|---|
| Distances D (mm) | 4 | 4 | 4 | 4 |
| Complex modulus E* (MPa) | 10 | 10 | 10 | 10 |
| Appearance performance (presence or absence of distortion) | absence | absence | absence | absence |
| Steering stability (score) | 97 | 100 | 100 | 97 |
| Weight (index) | 100 | 100 | 100 | 100 |
| Durability (index) | 100 | 100 | 100 | 100 |

|  | Ex. 15 | Ex. 16 | Ex. 17 | Ex. 18 | Ex. 19 | Ex. 20 |
|---|---|---|---|---|---|---|
| First cord angles θ1 (deg.) | 87 | 21 | 21 | 21 | 21 | 21 |
| Second cord angles θ2 (deg.) | −87 | −21 | −21 | −21 | −21 | −21 |
| Third cord ply(plies) | 1 ply | 1 ply | 1 ply | 1 ply | 1 ply | 1 ply |
| Third cord angles θ3 (deg.) | 0 | 0 | 0 | 0 | 0 | 0 |
| Fourth cord ply(plies) | absence | absence | absence | absence | absence | absence |
| Fourth cord angles θ4 (deg.) | — | — | — | — | — | — |
| Fourth cord elastic modulus (relative relation between first cords and second cords) | — | — | — | — | — | — |
| Fifth cord ply(plies) | absence | absence | absence | absence | absence | absence |
| Fifth cord angles θ5 (deg.) | — | — | — | — | — | — |
| Outer reinforcing cord layer | 2 plies | 2 plies | 2 plies | 2 plies | 2 plies | 2 plies |
| Inner reinforcing cord layer | 1 ply | 1 ply | 1 ply | 1 ply | 1 ply | 1 ply |
| Distances D (mm) | 4 | 3 | 2 | 4 | 4 | 4 |
| Complex modulus E* (MPa) | 10 | 10 | 10 | 2.5 | 2 | 1.7 |
| Appearance performance (presence or absence of distortion) | absence | absence | absence | absence | absence | absence |
| Steering stability (score) | 95 | 100 | 95 | 100 | 100 | 97 |
| Weight (index) | 100 | 102 | 105 | 100 | 100 | 100 |
| Durability (index) | 100 | 97 | 95 | 100 | 97 | 95 |

As apparent from Table 1, it is confirmed that the air-less tires in accordance with the examples improve appearance, steering stability, weight and durability as compared with the comparative examples.

REFERENCE SIGNS LIST 1 air-less tire
2 tread ring
2 tread ring
3 hubs
4 spokes
5 outer reinforcing cord layer
6 inner reinforcing cord layer
7 shear rubber layer
21 ground contact surface
22 tread rubber
51 first cord ply
52 second cord ply
53 fourth cord ply
54 fifth cord ply
56 first cords
57 second cords
58 fourth cords
59 fifth cords
61 third cord ply
66 third cords

The invention claimed is:

1. An air-less tire construction comprising:
an annular tread ring having a ground contact surface;
a hub to be fixed to an axle and disposed radially inward of the tread ring; and
spokes connecting the tread ring and the hub;
wherein the tread ring comprises a tread rubber forming the ground contact surface, an outer reinforcing cord layer disposed proximately to the tread rubber, an inner reinforcing cord layer disposed radially inward of the outer reinforcing cord layers and a shear rubber layer disposed between the outer reinforcing cord layer and the inner reinforcing cord layer,
wherein the outer reinforcing cord layer, with respect to the number of plies, is greater than the inner reinforcing cord layer,
wherein the outer reinforcing cord layer comprises:
a first cord ply having first cords coated with a topping rubber, the first cords inclining with respect to a tire circumferential direction; and
a second cord ply disposed radially outward of the first cord ply and having second cords coated with a topping rubber, the second cords inclining in an opposite direction to the first cords with respect to the tire circumferential direction, wherein the second cord ply is superimposed on the first cord ply such that the topping rubber of the second cord ply is in contact with the topping rubber of the first cord ply,
wherein the inner reinforcing cord layer comprises a third cord ply having third cords coated with a topping rubber, the third cords arranged in parallel with either the tire circumferential direction or a tire axial direction, and
wherein the first cord ply is superposed on the third cord ply through the shear rubber layer such that radial distances between the first cords and the third cords are greater than radial distances between the first cords and the second cords.

2. The air-less tire construction as set forth in claim 1, wherein the first cords are arranged in a line symmetrical manner to the second cords with respect to a tire circumferential line.

3. The air-less tire construction as set forth in claim 2, wherein the outer reinforcing cord layer further comprises a fourth cord ply having forth cords, and the fourth cord ply is disposed radially outward of the second cord ply.

4. The air-less tire construction as set forth in claim 2, wherein the outer reinforcing cord layer further comprises a fifth cord ply having fifth cords, and the fifth cord ply is disposed radially inward of the first cord ply.

5. The air-less tire construction as set forth in claim 2, wherein the third cords are arranged in parallel with the tire circumferential direction.

6. The air-less tire construction as set forth in claim 1, wherein the outer reinforcing cord layer further comprises a fourth cord ply having forth cords, and the fourth cord ply is disposed radially outward of the second cord ply.

7. The air-less tire construction as set forth in claim 6, wherein the fourth cords are arranged in parallel with the tire circumferential direction, and the fourth cords have an elastic modulus equal to or less than those of the first cords and the second cords.

8. The air-less tire construction as set forth in claim 7, wherein the outer reinforcing cord layer further comprises a fifth cord ply having fifth cords, and the fifth cord ply is disposed radially inward of the first cord ply.

9. The air-less tire construction as set forth in claim 7, wherein the third cords are arranged in parallel with the tire circumferential direction.

10. The air-less tire construction as set forth in claim 6, wherein the outer reinforcing cord layer further comprises a fifth cord ply having fifth cords, and the fifth cord ply is disposed radially inward of the first cord ply.

11. The air-less tire construction as set forth in claim 6, wherein the third cords are arranged in parallel with the tire circumferential direction.

12. The air-less tire construction as set forth in claim 1, wherein the outer reinforcing cord layer further comprises a fifth cord ply having fifth cords, and the fifth cord ply is disposed radially inward of the first cord ply.

13. The air-less tire construction as set forth in claim 12, wherein the fifth cords are arranged in parallel with the tire circumferential direction.

14. The air-less tire construction as set forth in claim 13, wherein the third cords are arranged in parallel with the tire circumferential direction.

15. The air-less tire construction as set forth in claim 12, wherein the third cords are arranged in parallel with the tire circumferential direction.

16. The air-less tire construction as set forth in claim 1, wherein the third cords are arranged in parallel with the tire circumferential direction.

17. The air-less tire construction as set forth in claim 1, wherein angles of the first cords are in a range of from 5 to 85 degrees with respect to the tire circumferential direction.

18. The air-less tire construction as set forth in claim 1, wherein the radial distances between the first cords and the third cords are not less than 3 mm.

19. The air-less tire construction as set forth in claim 1, wherein the shear rubber layer has a complex modulus equal to or more than 2 MPa.

* * * * *